(12) United States Patent
Nebel

(10) Patent No.: US 8,757,458 B2
(45) Date of Patent: Jun. 24, 2014

(54) STORAGE BOX WITH SLIDE OUT STORAGE TRAY

(75) Inventor: Michael W. Nebel, Smith Center, KS (US)

(73) Assignee: Lippert Components, Inc., Goshen, IN (US)

( * ) Notice: Subject to any disclaimer, the term of this patent is extended or adjusted under 35 U.S.C. 154(b) by 1 day.

(21) Appl. No.: 12/906,788

(22) Filed: Oct. 18, 2010

(65) Prior Publication Data
US 2011/0037286 A1 Feb. 17, 2011

Related U.S. Application Data

(63) Continuation-in-part of application No. 12/475,062, filed on May 29, 2009, now abandoned.

(60) Provisional application No. 61/252,474, filed on Oct. 16, 2009.

(51) Int. Cl.
| | |
|---|---|
| B60R 7/00 | (2006.01) |
| B60R 9/00 | (2006.01) |
| B60R 11/00 | (2006.01) |
| B60R 5/00 | (2006.01) |
| B60R 11/06 | (2006.01) |
| B62D 25/24 | (2006.01) |
| B62D 43/00 | (2006.01) |
| B60N 3/12 | (2006.01) |
| B60P 3/34 | (2006.01) |
| B62C 1/06 | (2006.01) |
| B62D 33/08 | (2006.01) |
| A47B 96/00 | (2006.01) |
| A47B 81/00 | (2006.01) |
| A47B 97/00 | (2006.01) |
| A47B 88/00 | (2006.01) |
| E06B 1/00 | (2006.01) |
| A47B 95/02 | (2006.01) |
| A47B 95/00 | (2006.01) |

(52) U.S. Cl.
USPC ........... 224/404; 224/403; 224/495; 224/510; 224/512; 224/518; 224/522; 224/523; 224/524; 224/42.32; 224/548; 224/554; 224/566; 296/37.1; 296/37.6; 296/26.01; 296/26.09; 296/26.12; 296/26.13; 312/270.3; 312/273; 312/274; 312/286; 312/311; 312/321.5; 312/332.1; 312/333

(58) Field of Classification Search
USPC ......... 224/403, 495, 510, 512, 518, 522, 523, 224/524, 42.32, 548, 566, 554; 296/37.1, 296/37.6, 26.01, 26.09, 26.12, 26.13; 312/270.3, 273, 274, 286, 293, 311, 312/321.5, 332.1, 333
See application file for complete search history.

(56) References Cited

U.S. PATENT DOCUMENTS 1,143,443 A * 6/1915 Schramm ...................... 312/246
2,812,992 A * 11/1957 Lysen ............................ 312/311
(Continued)

OTHER PUBLICATIONS

Information about Related Patents and Patent Appliations, see the section of the accompanying Information Disclosure Statement Letter entitled "Related Patents and Patent Applications" for further information.

(Continued)

Primary Examiner — Brian D Nash
Assistant Examiner — Derek Battisti
(74) Attorney, Agent, or Firm — Holland & Hart LLP

(57) ABSTRACT

A storage box comprises a housing with open ends and a tray that slides out either open end and up to at least fifty percent or up to at least sixty percent of the length of the tray may slide out either open end. Latch members operable from either open end of the housing selectively hold the tray in a centered position and can be released to allow the tray to slide out a selected end of the housing. Multiple latch member mating members may be associated with the housing for selective engagement by the latch members to latch the tray in multiple extended positions between the centered position and fully retracted positions out either the first or second open ends. Latch engagement members mounted on the doors engage latches connecting the tray to the housing when the doors are shut to prevent the latches from becoming unlatched when the doors are shut.

20 Claims, 8 Drawing Sheets

(56) References Cited

U.S. PATENT DOCUMENTS

| | | | |
|---|---|---|---|
| 3,092,428 A | 6/1963 | Kerschner | |
| 3,142,517 A | 7/1964 | Ward | |
| 4,118,086 A * | 10/1978 | Kneier | 312/311 |
| 4,178,049 A * | 12/1979 | Loo | 312/286 |
| 4,183,596 A * | 1/1980 | Greene et al. | 312/333 |
| 4,274,689 A | 6/1981 | Vander Ley et al. | |
| 4,779,692 A * | 10/1988 | Hagarty et al. | 180/68.5 |
| 4,917,430 A * | 4/1990 | Lawrence | 296/37.6 |
| 5,102,180 A * | 4/1992 | Finley | 296/37.6 |
| 5,125,710 A | 6/1992 | Gianelo | |
| 5,255,983 A | 10/1993 | Parvin | |
| 5,542,759 A | 8/1996 | Krivec | |
| 5,730,514 A | 3/1998 | Hashemi | |
| 5,848,818 A | 12/1998 | Flueckinger | |
| 6,224,138 B1 * | 5/2001 | Adsit et al. | 296/100.05 |
| 6,422,629 B2 | 7/2002 | Lance et al. | |
| 6,502,910 B2 | 1/2003 | Kuo-Chan | |
| 6,695,375 B1 | 2/2004 | May | |
| 6,729,703 B2 | 5/2004 | Le | |
| 6,811,068 B2 | 11/2004 | Johnson | |
| 6,923,354 B2 | 8/2005 | Axelson | |
| 6,997,527 B2 | 2/2006 | Cheng | |
| 7,048,320 B2 * | 5/2006 | Rubel et al. | 296/37.6 |
| 7,204,538 B2 * | 4/2007 | Warlick et al. | 296/37.1 |
| 7,219,941 B1 * | 5/2007 | San Paolo et al. | 296/37.6 |
| 2007/0007786 A1 | 1/2007 | Doyle | |
| 2008/0191506 A1 | 8/2008 | Huotari et al. | |
| 2008/0231066 A1 | 9/2008 | Harrell | |

OTHER PUBLICATIONS

Product brochure for slide out tray for recreational vehicle on sale more than one year prior to filing of present application.

Web advertisement for cargo hutch tool box, date of first sale unknown, http://cargohutch.com/. 9 pages.

\* cited by examiner

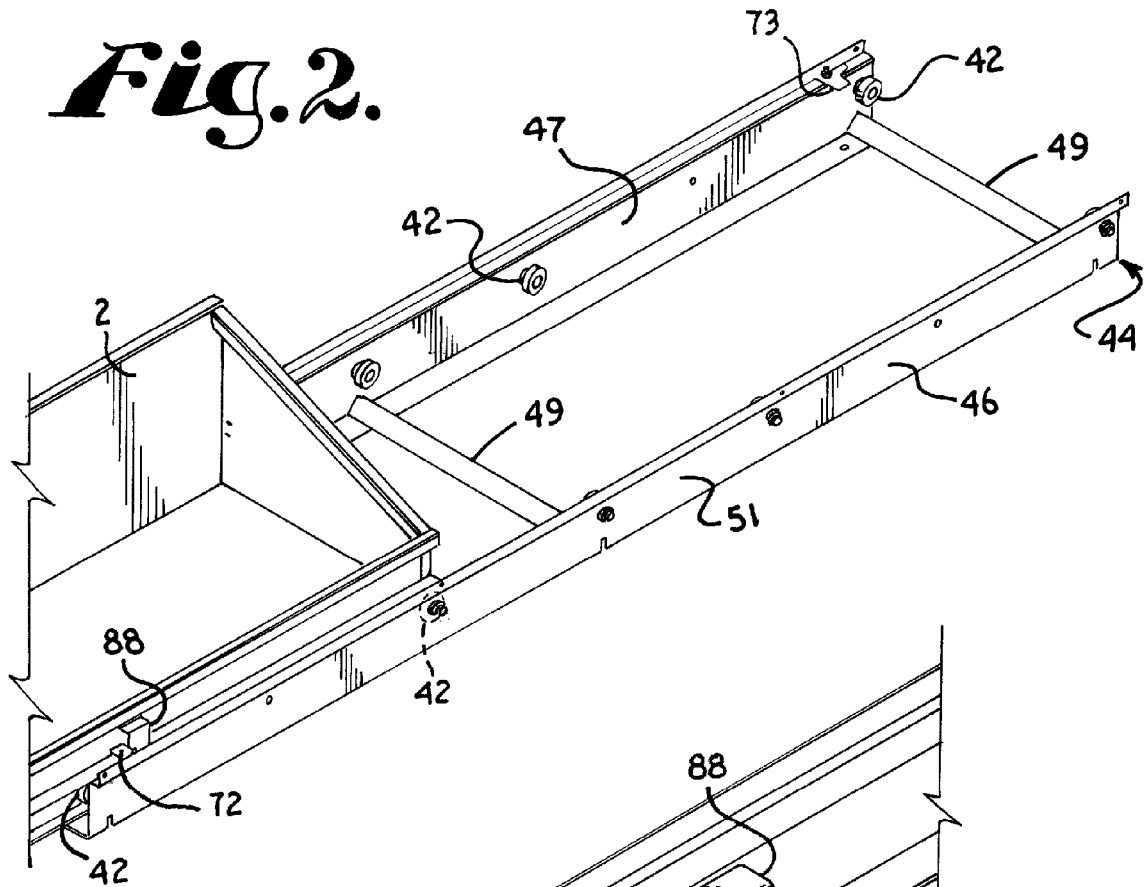

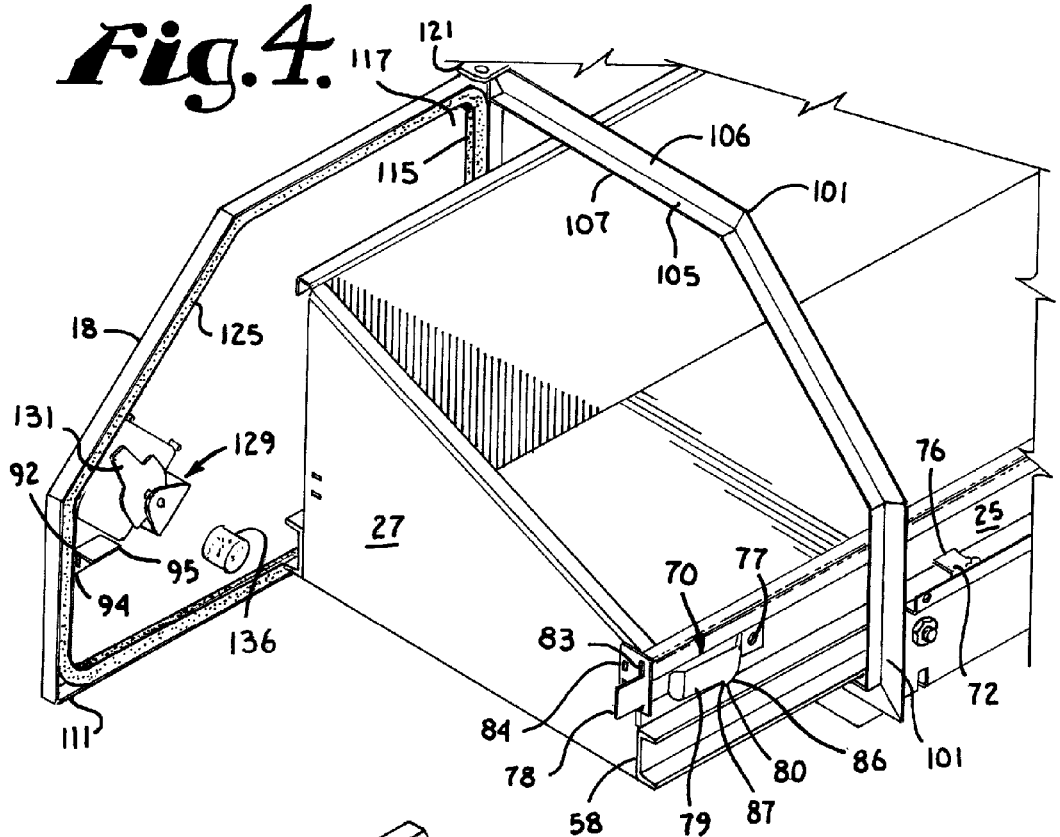
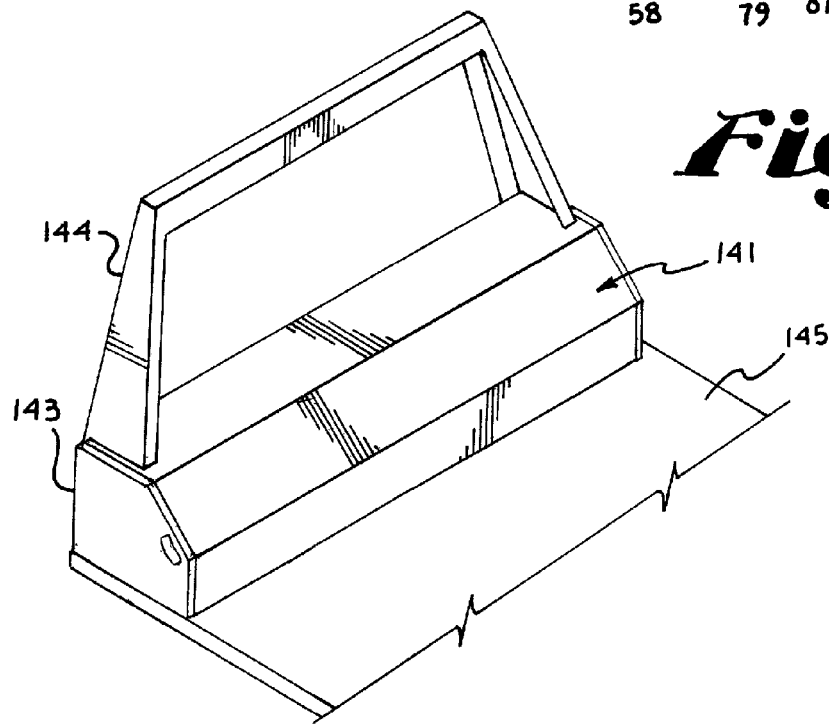

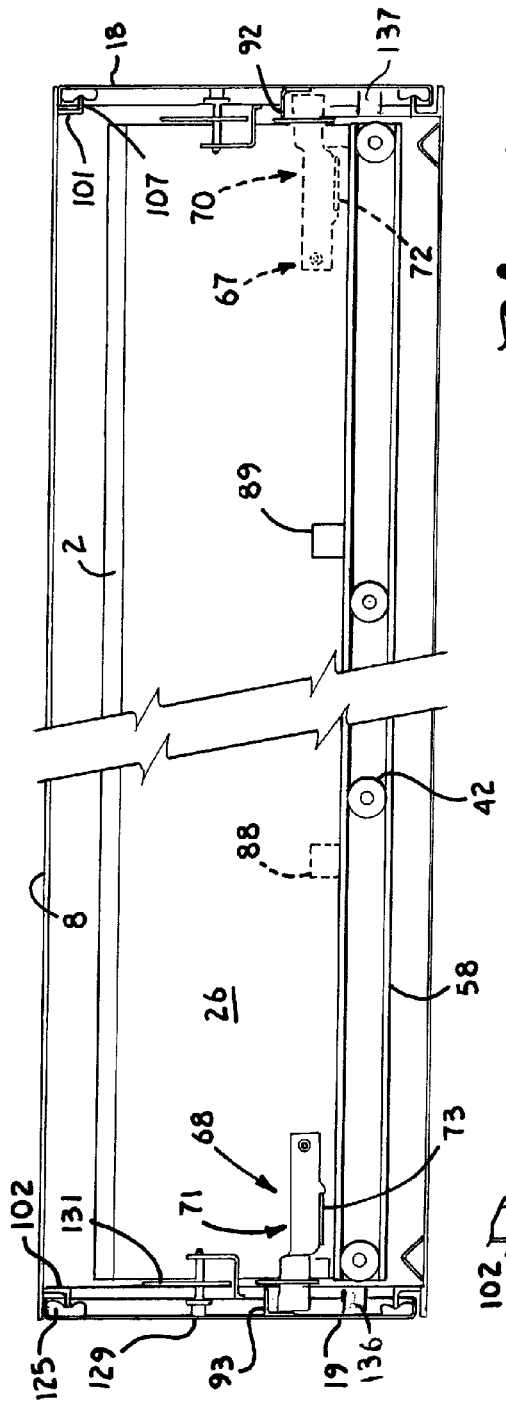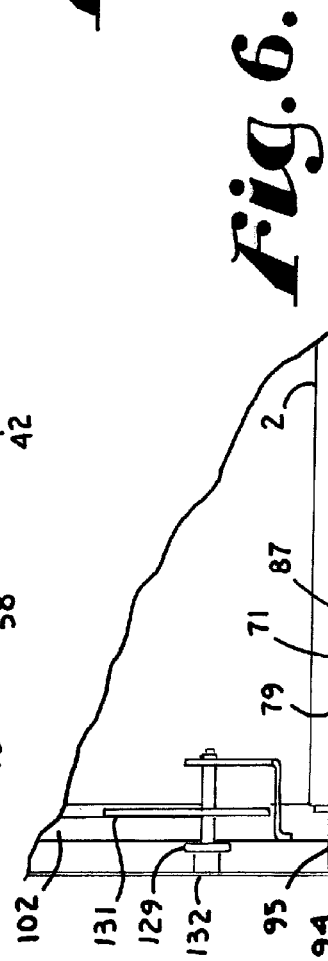

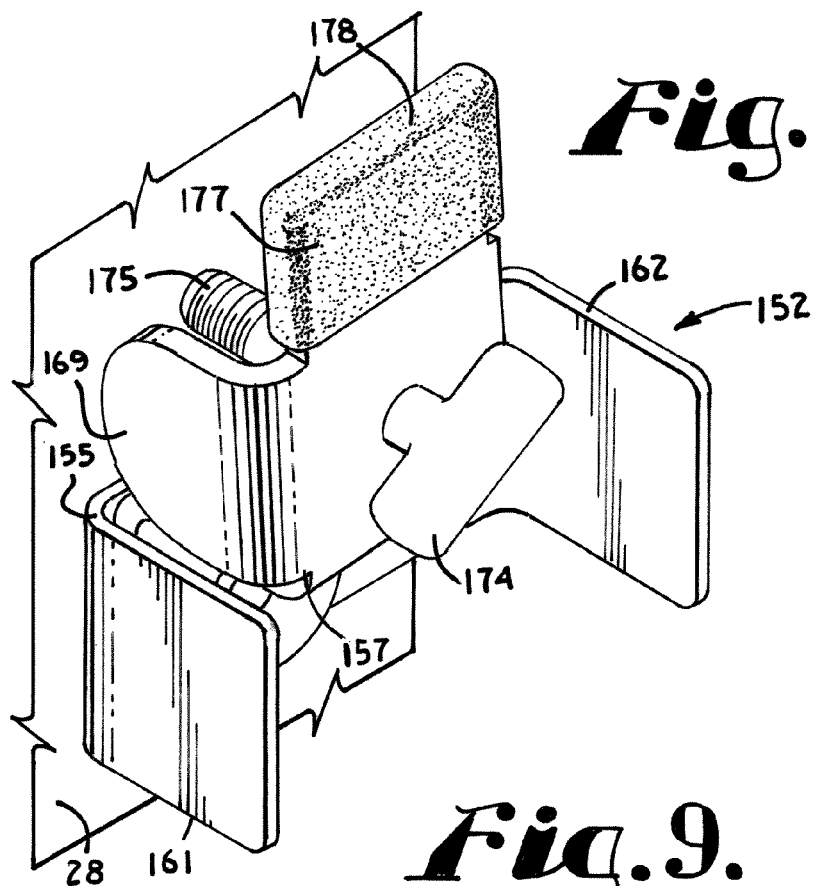
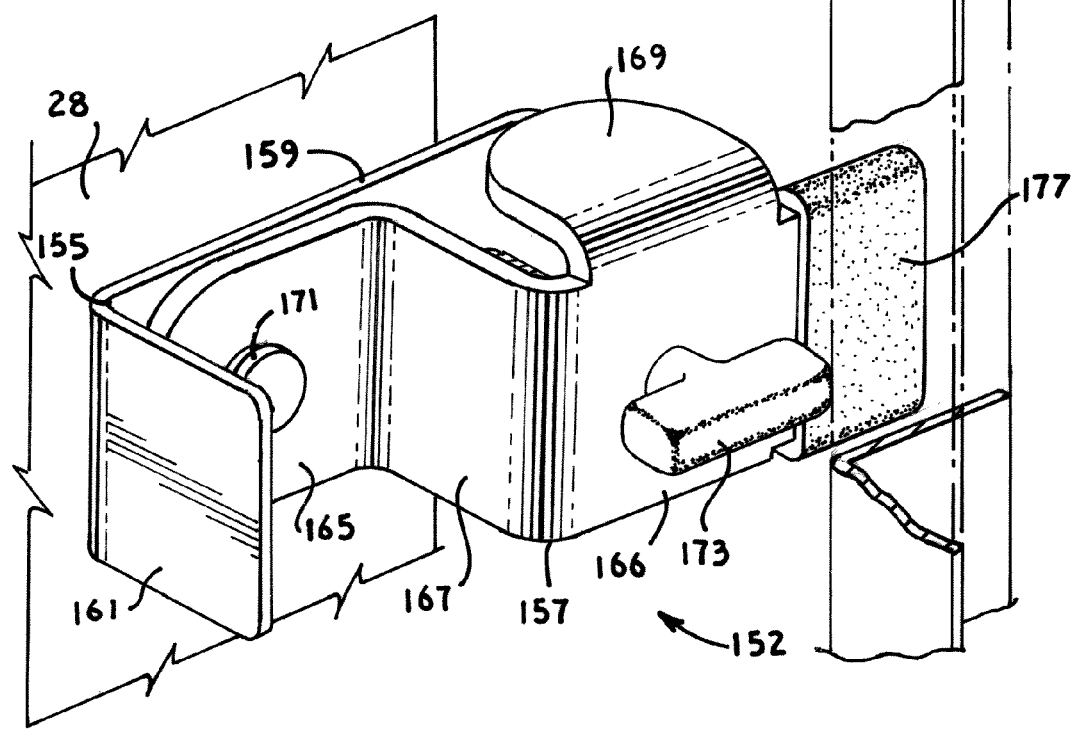

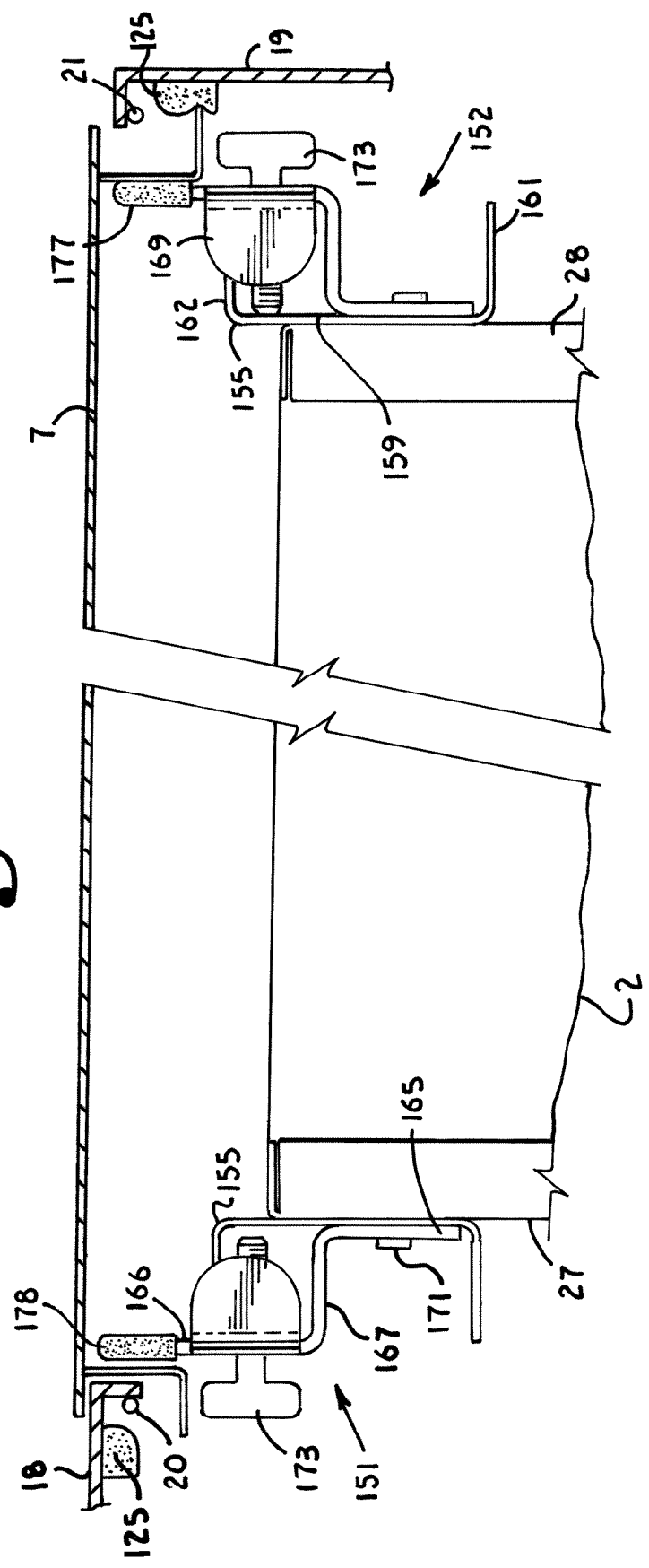

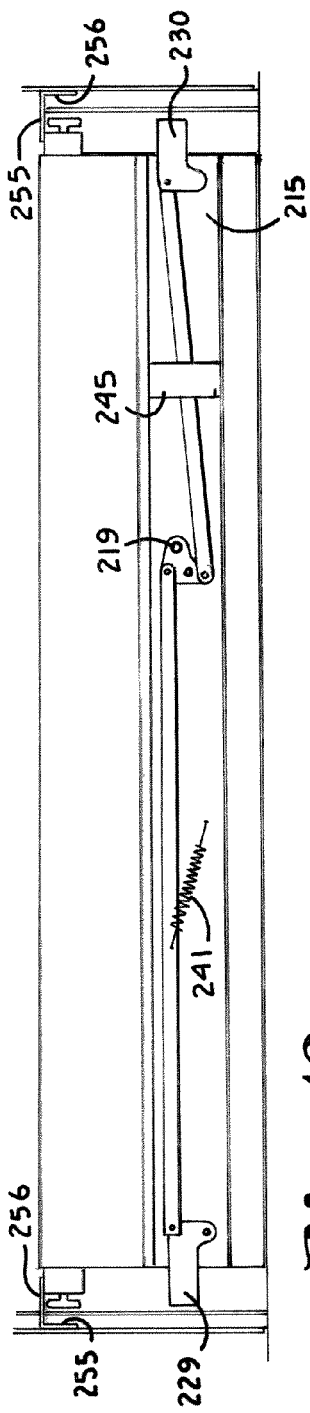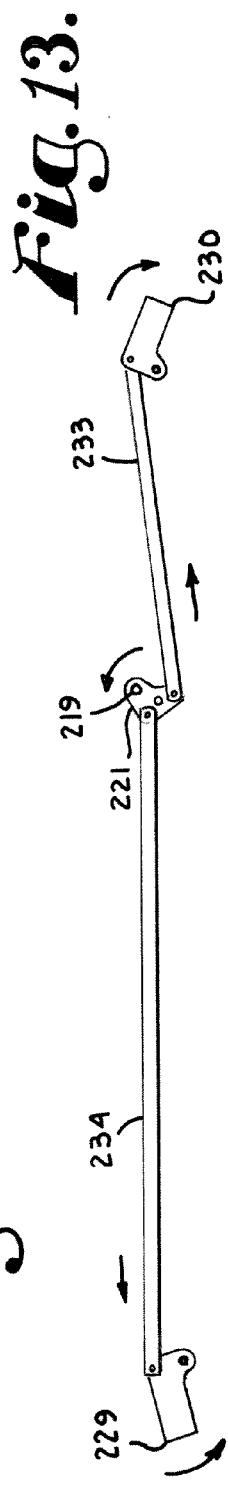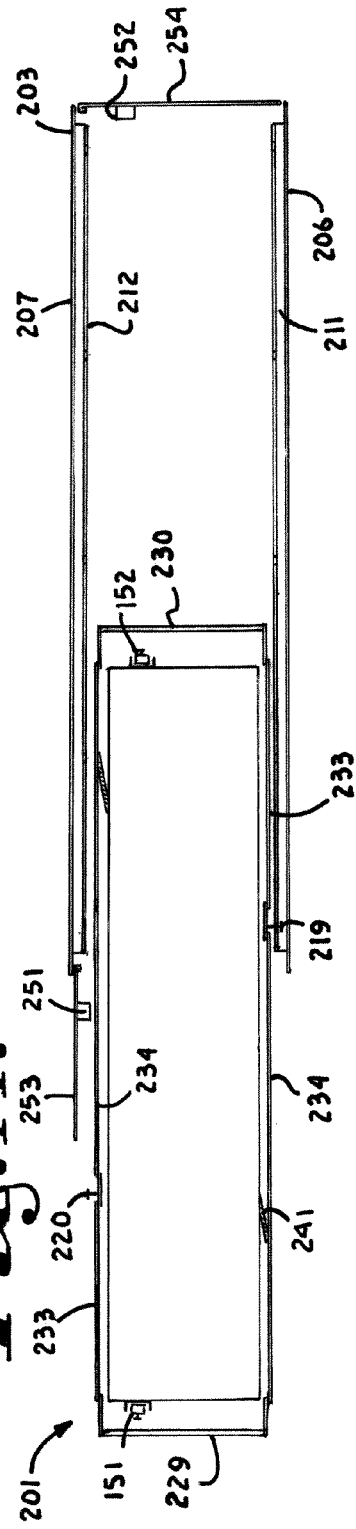

STORAGE BOX WITH SLIDE OUT STORAGE TRAY

CROSS-REFERENCE TO RELATED PATENT APPLICATIONS

This patent application is a continuation-in-part of U.S. patent application Ser. No. 12/475,062, entitled "Storage Box with Slide Out Storage Tray," and filed on 29 May 2009, now abandoned, the entire contents of which are incorporated by reference herein. This patent application also claims the benefit of U.S. Provisional Patent Application No. 61/252,474, entitled "Storage Box with Slide Out Storage Tray with Vibration Dampeners and Multi-Position Latch," filed on 16 Oct. 2009, the entire contents of which are incorporated by reference herein.

BACKGROUND

The present invention relates to storage boxes for trucks and in particular storage boxes having a tray for storing tools and other articles and that slide into and out of the storage box.

Numerous types of storage boxes have been developed for storing tools and other equipment on or under the bed of a truck, including pick-up trucks and flatbed trucks. Storage boxes mounted on the bed of the truck typically have a hinged lid to provide access to the tools and equipment stored inside the box. It is also known to provide trays that slide out of an end of the box on rails or glides, in the nature of a drawer. The front face of the tray or drawer will generally function as a closure member or door, closing off the end of the box when the tray is slid into the box.

Problems with existing storage boxes for trucks are numerous. Boxes mounted across the front of the bed with hinged lids generally require climbing onto the truck bed to access the entire interior of the box. Moreover, if the truck is used for hauling material, such as large round bales of hay, it may be impossible to open the box when a bale is stored on the bed and partially over the box. In addition, the area above most existing storage boxes must remain free of objects or obstructions so as not to block opening of the storage box.

Existing slide out trays for truck mounted storage boxes, only slide out one side or end of the box. It is known to mount two slide out trays in one box, with each drawer extending approximately half the length of the box and sliding out opposite ends. However, such trays limit the length of an item that can be stored therein to less than half the width of the truck bed.

In slide out tool trays wherein the end of the tray forms the door for closing the box, if the seals around the door fail, water that leaks into the box is likely to travel down the inside surface of the door and into the tool tray. Water, which then collects in the bottom of the tray, dampens the tools and equipment stored therein, promoting rust and damage to the stored articles.

Slide out trays also must be capable of being securely locked in place when in the stored position as the truck is moving. In storage compartments for slide out trays which are closed off by a separate hinged door, if the tray comes unlatched and slides even an inch or so as the truck rounds a corner, the force of the tray sliding against the door can damage the door, or worse force the door open and allowing the tray to slide out while the truck is moving.

There remains a need for an improved storage box with a slide out tray for use with secondary structures such as vehicles, including pick-up and flat bed trucks that addresses the foregoing problems.

SUMMARY

The present invention is directed to a storage box for mounting to a secondary structure, such as the bed or frame of a truck, trailer or other vehicle, and which includes a storage tray that slides out either open end of the storage box housing. The storage box housing includes a pair of spaced apart sidewalls, a cover panel and first and second open ends. The tray is slidably mounted within the housing on a bearing or glide assembly connected between the sidewalls of the tray and the housing sidewalls. Doors, connected to the housing across first and second open ends respectively, are selectively advanceable into and out of closed relationship with the open ends of the housing to enclose the storage tray retracted into the housing and protect items stored in the tray from precipitation.

The storage box utilizes a pair of latch assemblies associated with opposite ends of the storage tray to selectively hold the storage tray in a retracted position. The latch assemblies may also be used to secure the tray in multiple extended positions relative to and out either open end of the housing.

In one embodiment, a first latch assembly includes a first movable latch member and a first latch keeper. The first latch member is pivotally mounted on a front sidewall of the tray proximate a first end thereof. The first latch keeper is connected to and projects inward from the front sidewall of the storage box housing. A second latch assembly similarly includes a second movable latch member and a second latch keeper. The second latch member is pivotally mounted on a rear sidewall of the tray proximate a second end thereof and the second latch keeper is connected to and projects inward from the rear sidewall of the storage box housing. When the tray is centered within the housing, which may be referred to as the retracted position, fingers on the first and second latch members engage inner surfaces of the first and second latch keepers respectively to prevent the tray from sliding past the latch members in either direction out of the housing open ends. Pivoting of a selected latch member upward advances the associated finger out of engagement with the corresponding latch keeper so that the tray may be slid past the latch member and out of the corresponding open end.

A first stop is connected to and projects outward from the front sidewall of the tray and a second stop is connected to and projects outward from the rear sidewall of the tray. The stops are mounted on the tray sidewalls behind or inward relative to the latch keeper a selected distance, corresponding to the distance that the tray can be withdrawn from the housing. When the tray is pulled or slid out of the housing through the first opening the selected distance, the stop projecting outward from the front sidewall of the tray engages or abuts against the latch keeper projecting inward from the housing front sidewall to prevent further outward sliding of the tray through the first opening. When the tray is pulled or slid out of the housing through the second opening the selected distance, the stop projecting outward from the rear sidewall of the tray engages or abuts against the latch keeper projecting inward from the housing rear sidewall to prevent further outward sliding of the tray through the second opening. Inwardly facing edges of the latch member fingers are downwardly and outwardly sloped so that when the tray is slid back to the retracted position, the inward facing edges of the fingers function as a cam surface to pivot the latch member over the latch keeper. When the tray is fully retracted and the finger has traveled inward past the latch keeper, the latch member pivots back downward by gravity so that the finger extends behind the associated latch keeper, which prevents the tray from sliding outward from the refracted position.

A latch engagement member is mounted on each door of the housing. When the door is closed, the latch engagement member engages the associated pivotal latch member and holds it in position to prevent the latch member from inadvertently becoming disengaged from the latch keeper which would allow the tray to slide within the housing.

In a second embodiment, first and second latch members are pivotally mounted on opposite sides of the tray. The latch members are normally urged into engagement with latch member receivers associated with the storage box housing to latch the tray in place. A latch actuator assembly including first and second latch actuator handles mounted to the tray proximate first and second ends respectively and connected to the latch members by linkages is operable to selectively advance the latch members out of engagement with the latch member receivers. More specifically, either latch handle is operable from a corresponding end of the tray and through the linkages to pivot the latch members out of engagement with aligned receivers. A plurality of receivers or mating members are formed along the housing sidewalls and selectively engageable by the latch members to permit the tray to be selectively secured in incremental lengths of extension out either the first or second open ends of the housing. The latch members are offset from one another on opposite sides of the tray, with each being closer to an opposite end of the tray, to allow the tray to be extended at least fifty percent and preferably up to at least sixty percent of its length out either end of the housing.

Dampeners, acting against the tray in opposite directions may be utilized to restrain the tray in a retracted position and prevent rattling and the like.

DRAWINGS

FIG. 2 is an enlarged and fragmentary, perspective view of the storage box as shown in FIG. 1 with portions of the storage box removed to show interior detail of the storage tray and the side rails on which the tray is mounted and with the storage tray shown fully extended to the left relative to side rails.

FIG. 3 is a greatly enlarged and fragmentary perspective view of the storage tray slide to the left relative to side rails as in FIG. 3.

FIG. 4 is an enlarged and fragmentary perspective view of the storage tray as shown in FIG. 1 showing details of a latching mechanism for securing the storage tray in a stored position relative to the storage box.

FIG. 5 is a fragmentary rear view of the storage box as shown in FIG. 1 with a rear cover panel removed to show interior detail.

FIG. 6 is an enlarged and fragmentary view of a portion of the storage box as shown in FIG. 5.

FIG. 7 is a perspective view of an alternative embodiment of the storage box integrated into a headache rack of a flatbed truck.

FIG. 8 is a fragmentary, perspective view of a tray restraining assembly mounted on a right end wall of the storage tray and positioned in a disengaged orientation.

FIG. 9 is a fragmentary, perspective view of the tray restraining assembly as shown in FIG. 9 shown positioned in an engaged position and engaging a door frame member.

FIG. 10 is a fragmentary, top plan view of the storage box incorporating tray restraining assemblies on both ends of the storage tray and with the storage box cover panel removed to show detail therebelow.

FIG. 12 is a side view of a storage box for the storage tray incorporating the alternative embodiment of the latch assembly with portions of the storage box removed to show details thereof.

FIG. 13 is a schematic, side view of a latch mechanism of the latch assembly showing the latch mechanism moved to an unlatched position.

FIG. 14 is a partially schematic, top plan view of the storage box as in FIG. 12 with portions of the housing removed to show detail and the tray shown extending out the left side of the storage box.

DETAILED DESCRIPTION

Figure 1:
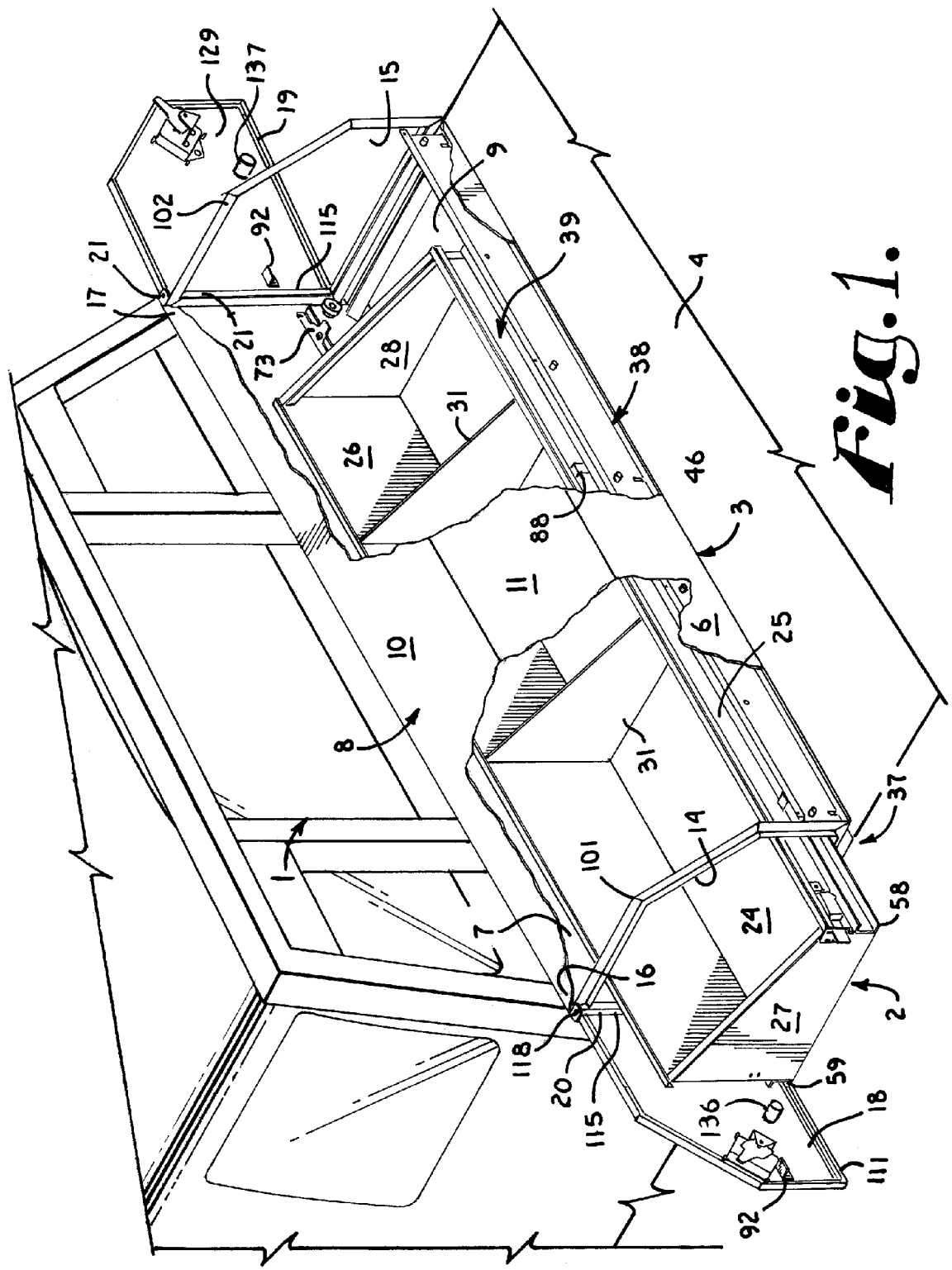
FIG. 1 is a perspective view of a storage box mounted on a flat bed truck with a storage tray extending partially out a left end of the storage box and with portions of a cover for the storage box removed to show interior details.
Figure 11:
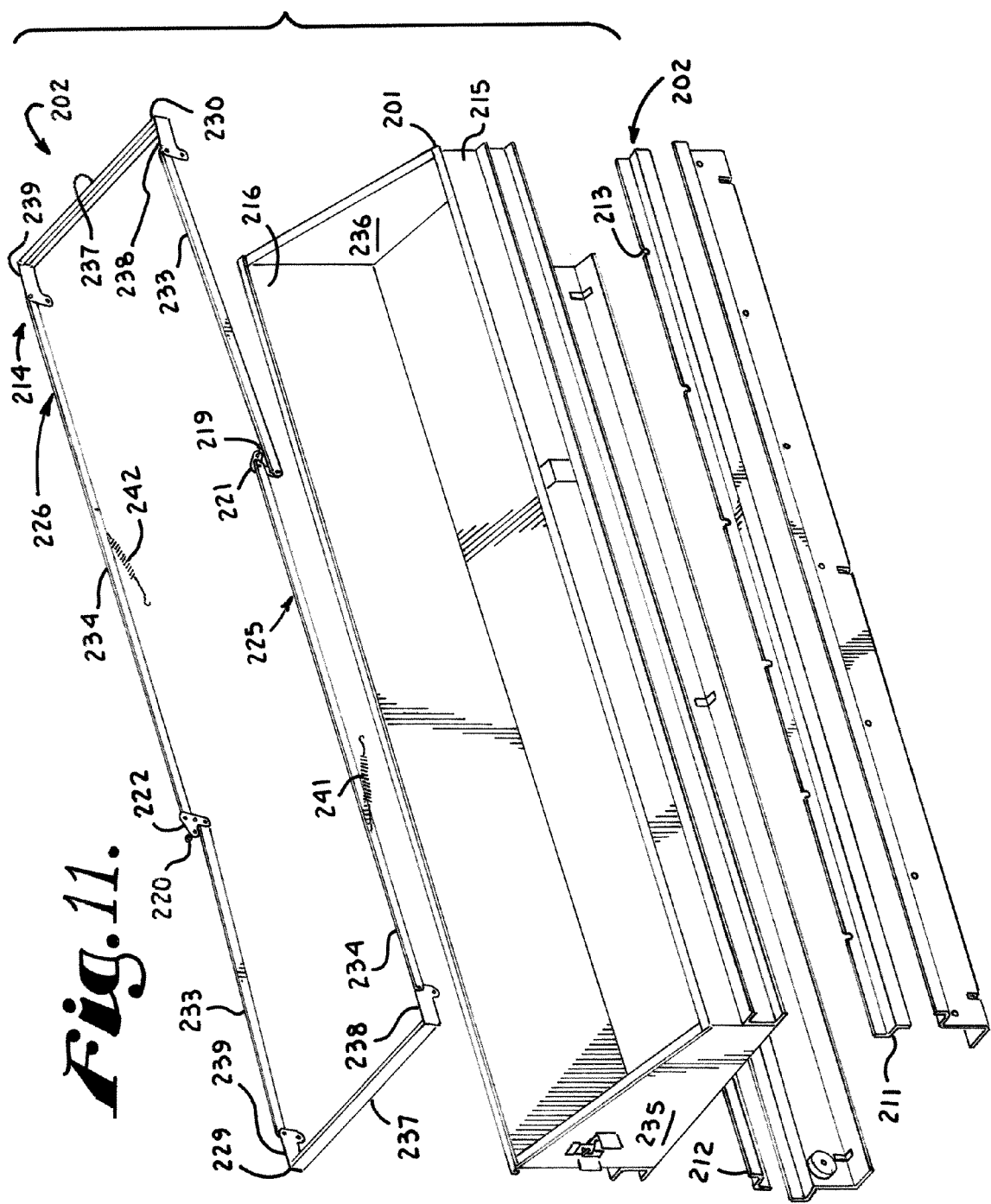
FIG. 11 is an exploded, perspective view of an alternative embodiment of a latch assembly for the storage tray which permits the tray to be latched in position relative to the storage box in multiple incremental degrees of withdrawal from the box.

Referring to the drawings in more detail, the reference numeral 1 refers to a storage box having storage tray 2 slidably mounted within a storage box housing 3 so that the tray 2 slides out either end of the housing 3. The storage box 1 is particularly well adapted for mounting on vehicles 4 such as trucks or trailers and is shown mounted on a flat bed truck in FIG. 1. The storage box 1 may be sold as an accessory to be attached to the vehicle after the initial production of the vehicle. As described herein, directional references with respect to the storage box 1, storage tray 2 and the housing 3 generally correspond to the orientation of the box 1 as accessed by a user, which is generally opposite of the typical directional references applied to the vehicle 4. More specifically, the box 1 as shown in the embodiment of FIG. 1 faces in an opposite direction of the vehicle so that the front of the storage box 1 faces the rear of the truck 4 and the rear of the box 1 faces the front of the truck 4. As the user faces the front of the box 1, the left side of the box 1 is to the user's left and the right side of the box is to the user's right.

The storage box housing 3 of the embodiment shown, includes a front panel or sidewall 6, a rear panel or sidewall 7 a cover 8 and an open bottom 9. The cover 8 of the embodiment shown in FIGS. 1 and 2 includes a horizontal top panel 10 and an angled front face or panel 11 sloping downward from the top panel 10 to the front sidewall 6 at an angle of approximately forty five degrees. Left and right openings 14 and 15 are formed in left and right ends 16 and 17 of the housing. Left and right side doors 18 and 19 are connected by hinges 20 and 21 to the rear sidewall 7 of the housing 3 adjacent the left and right openings 14 and 15 respectively. The doors 18 and 19 are pivotable into and out of covering relationship with the openings 14 and 15 respectively.

Front and rear flanges (not shown) are formed on and project inward from the front and rear housing sidewalls 6 and 7 respectively. The upper surface of the bed of the flat bed truck generally forms the bottom of the storage box 1, so the bottom 9 of the housing is left open between the flanges.

The storage tray 2 includes a floor or bottom panel 24, front and rear sidewalls 25 and 26, left and right end walls 27 and 28 and an open top. In the embodiment shown, the rear sidewall 26 is taller than the front sidewall 25 and the end walls 27 and 28 slope downward from back to front. Various dividers 31, tool holders, smaller storage trays and the like can be mounted in or to the primary storage try 2 to organize and hold tools and other equipment or supplies within the storage box 1.

The storage tray 2 is slidably or rollably mounted within the storage box 1 on a glide assembly 37 which is similar in function to a drawer slide which is best seen in FIGS. 2 and 3. The glide assembly 37 includes a first glide sub-assembly 38 connected to the housing 3 and a second glide sub-assembly 39 connected to the tray 2. The first glide sub-assembly 38 includes a plurality of rollers or roller bearings 42 rotatably mounted on a roller bearing frame 44 which is bolted or otherwise connected to the housing sidewalls 6 and 7 such that the roller bearings 42 may be described as being connected to and part of the front and rear sidewalls 6 and 7 of the housing 3.

The roller bearing frame 44 includes front and rear roller support beams 46 and 47 interconnected by a plurality of cross members 49. Each roller support beam 46 includes a vertical web 51 with a lower flange 52 formed along and projecting inward from a lower edge of the web 51 and an upper flange 53 formed along and projecting outward from an upper edge of the web 51. The upper flange 53 includes a horizontal leg 54 and a vertical leg 55 that extends upward from a distal end of the horizontal leg 54. The vertical leg 55 includes a plurality of bolt or screw holes formed therein (one shown in FIG. 3) for connecting the roller support beam 46 or 47 to an inner surface of the corresponding housing sidewall 6 or 7 respectively. The lower flange 52 of each roller support beam 46 and 47 are supported on the flanges projecting inward from the housing sidewalls 6 and 7. Screw holes (not shown) are formed in the lower flanges 52 near left and right ends 16 and 17 of the housing to facilitate driving of a screw therethrough to secure the storage box 1 to a surface such as the bed of a flat bed truck 1. It is to be understood that because the roller support beams 46 and 47 are connected to the housing, they may be considered part of the housing 3.

The roller bearings 42 are mounted on shafts 56 which extend through the vertical web 51 and are bolted or otherwise secured to the vertical web 51. The roller bearings 42 are secured in spaced relation on the support beams 46 and 47 and project inward therefrom. The axes of the rollers 42 extend in horizontal alignment.

The second glide sub-assembly 39, mounted on the tray 2 comprises front and rear channel members 58 and 59 connected to the front and rear sidewalls 25 and 26 respectively. Each channel member 58 and 59 includes a vertical web 61 which abuts and is secured to the associated sidewall 25 and 26 and upper and lower, outwardly projecting legs 62 and 63. The channel members 58 and 59 preferably run the full length of the tray sidewalls 25 and 26 in horizontal alignment.

The tray 2 is glidingly mounted on the rollers 42 such that the rollers 42 extend between the upper and lower legs 62 and 63 of the channel members 58 and 59 on the tray sidewalls 25 and 26. The upper leg 62 of each channel member 58 and 59 bears down on and is supported by the rollers 42 such that the tray 2 rolls on rollers 42 and glides or slides into and out of the housing 3.

The tray 2 is shorter than the housing 3. When the tray 2 is centered relative to the housing 3 as shown in FIG. 5, which may be referred to as a retracted or centered position, the tray 2 is completely enclosed by the housing 3. From the retracted position, the tray may slide in either direction, out either the left or right opening 14 or 15 in housing 3. As will be discussed in more detail below, the tray 2 can slide out either opening preferably at least fifty percent of its length and in the embodiment shown approximately sixty-five percent or in some embodiments up to approximately eighty percent of its length to a left extended position (as shown in FIG. 2) or a right extended position to allow access to the contents of the tray 2.

As best seen in FIG. 5, which is a rear view of the storage box with the rear panel removed to show detail, left and right side latch assemblies 67 and 68 are located proximate opposite corners of the storage box and operate to hold the storage tray 2 in the centered or retracted position. The latch assemblies may be selectively released to allow the tray 2 to slide out either open end of the housing 3. Each latch assembly 67 and 68 is of the same construction and includes a movable latch member and a latch keeper.

In the embodiment shown, a first moveable latch member 70 is pivotally mounted on the front sidewall 25 of the tray proximate the left end wall 27 and a second moveable latch member 71 is pivotally mounted on the rear sidewall 26 of the tray 2 proximate the right end wall 28. A first latch keeper 72 is bolted to the front roller support beam 46 proximate a left end thereof and projects inward relative to the support beam 46 and a second latch keeper 73 is bolted to the rear roller support beam 47 proximate a right end thereof projecting inward relative to the support beam 47.

Each latch keeper 72 and 73 is generally formed from a planar piece of sheet metal bolted to the associated roller support beam 46 or 47 respectively. Each keeper 72 and 73 includes an inwardly projecting leg 76 projecting generally perpendicular to and inward relative to the associated roller support beam 46 or 47. The inwardly projecting latch keeper leg 76 is generally rectangular.

Each moveable latch member 70 and 71 comprises a lever, having a pivot end 77, a grip end 78 and a central portion 79 with a latch finger or tooth 80 projecting downward from the central portion 79. Each latch member 70 and 71 is pivotally connected to the associated tray sidewall 25 and 26 respectively at the pivot end 77. The grip end 78 of each latch member 70 and 71 extends through a slot 83 formed in a guide plate 84 mounted on the tray end walls 27 and 28. The slot 83 limits the range of motion or pivoting of the latch members 70 and 71 between lowered and raised positions. In the lowered position, the latch members 70 and 71 extend generally horizontally. The grip end 78 of each latch member 70 and 71 extends approximately an inch past the associated end wall 27 and 28 of the tray 2.

An inner edge 86 of each latch finger 80 slopes downward and outwards, towards the corresponding open end 16 and 17 of the housing 3. An outer edge 87 of each latch finger 76 extends vertically when the latch members 70 and 71 are in the lowered position. The moveable latch members 70 and 71 and the latch keepers 72 and 73 are positioned so that when the tray 2 is in the centered or retracted position, the outer edge 87 of each latch finger 76 is positioned just inside of the inwardly projecting leg 76 of the associated latch keeper 72 and 73, thereby preventing the tray 2 from sliding in either direction past the latch keepers 72 and 73.

To slide the tray 2 out either end 16 or 17 of the housing 3, the associated latch member 70 or 71 is raised or pivoted upward to lift the latch finger 80 past the inwardly projecting leg 76 of the latch keeper 72 or 73 respectively. More specifically, to slide the tray 2 out of the left opening 14 in the housing, after opening door 18, the user grasps the grip end 78 of the latch member 70 on the left end of the tray 2 and pivots the latch member 70 upward so that the latch finger 80 is raised above the inwardly directed leg 76 of the latch keeper 72. To slide the tray 2 out of the right opening 15, after opening the door 19, the user pivots the latch member 71 on the right end of the tray 2 upward to disengage the latch finger 80 from the associated latch keeper 73. Once the latch finger 80 is disengaged from or moved from obstructing sliding movement of the tray 2, the user can then pull the tray 2 out the corresponding opening 14 or 15.

First and second stops or stop members 88 and 89 are mounted on the front and rear sidewalls 25 and 26 respectively of the tray 2 and are positioned to engage the inwardly projecting legs 76 of latch keepers 72 and 73 when the tray 2 is pulled a selected distance out openings 14 or 15 respectively, as shown in FIGS. 2 and 3 with the tray 2 pulled to a left extended position. As discussed above, the preferred distance that the tray 2 may be pulled out of the housing 3 is at least fifty percent of the length of the tray 2 and more preferably approximately sixty to eighty percent of the length of the tray 2. Although full extension would theoretically be preferred, it is not practical to achieve such a high degree of extension with slide out assemblies of the type used.

Therefore, each stop 88 and 89 is mounted on the corresponding tray sidewall 25 and 26 a distance of approximately two thirds the length of the tray 2 from the left and right end respectively. When the tray 2 is slid out the left opening 14 the selected distance, the stop 88 on the tray front sidewall 25 engages the inwardly directed leg 76 of latch keeper 72 connected to the front panel 6 of the housing 3 via the front roller support beam 46 to prevent further extension of the tray 2 out the left opening 14. Similarly, when the tray 2 is slid out the right opening 15 the selected distance, the stop 89 on the tray rear sidewall 26 engages the inwardly directed leg 76 of the second latch keeper 73 connected to the rear panel 7 of the housing 3 via the rear roller support beam 47 to prevent further extension of the tray 2 out the right opening 15. The position of the tray 2 extended out either opening 14 or 15 the selected distance limited by the stops 88 and 89 may be referred to as the left and right extended positions respectively.

Referring to FIG. 2 it can be seen that the stop 88 is positioned so that when the tray 2 is in the left extended position, two rollers 42 are still captured between the upper and lower legs 62 and 63 of the channel members 58 and 59. The left most roller 42 on each side supports or bears the weight of the tray 2 and the next inwardly spaced roller 42 functions as a cantilever support, preventing the front end of the tray 2 from tipping downward about the fulcrum created by the left most rollers 42.

When the tray 2 is advanced back to the retracted position, from the left extended position, the first latch member 70 automatically engages the first latch keeper 72 to hold the tray 2 in the refracted or centered position. More specifically, just prior to the tray 2 reaching the fully retracted position, the downwardly and outwardly sloping inner edge 86 of the latch finger 80 engages the inwardly directed leg 76 of the latch keeper 72, causing the latch member 70 to pivot upward until the latch finger 80 passes over the leg 76 of the latch keeper 72 as the tray 2 is rolled further inward. Once the latch finger 80 passes past the inner edge of the latch keeper leg 76, the latch member 70 is then allowed to pivot downward by gravity so that the outer edge 87 of the latch finger 80 is again positioned just inside of the latch keeper leg 76 to prevent the tray 2 from sliding back out the left opening 14. Simultaneously, engagement of the outer edge 87 of the latch finger 80 of second latch member 71 with the latch keeper 72 on the opposite end of the storage box 1, prevents the tray 2 from sliding out the right side opening 15.

The second latch member 71 interacts with the second latch keeper 73 in a similar manner to allow sliding of the tray 2 between the retracted position and the right extended position and automatic latching of the second latch member 71 to the second latch keeper 73. It is foreseen that a spring could be connected to each latch member 70 and 71 to normally bias or draw the latch members 70 and 71 to a lowered or latched position.

Latch engagement members or hold downs 92 and 93 are mounted on an inner surface of each door 18 and 19 respectively of the housing 3. The latch engagement members 92 and 93 in the embodiment shown are formed from an angle iron or angle member and include a vertical leg 94 and a horizontal leg and 95. The vertical leg 94 is positioned flush with the inner surface of the associated door 18 and 19 and the horizontal leg 95 projects perpendicular thereto. The latch engagement members 92 and 93 are positioned on the doors 18 and 19 so that when the door is closed, the horizontal leg 95 extends just above an upper edge of the latch member grip end 78 when the latch members 70 and 71 are in the lowered or latched position. Extension of the horizontal legs 95 just above the latch members 70 and 71 prevents the latch members 70 and 71 from inadvertently bouncing upward and out of engagement or blocking alignment with the latch keepers 72 and 73 respectively.

In addition, if the tray 2 is not advanced completely to the centered position, the tip of the grip end 78 of latch member 70 or 71 will extend past the associated end 16 or 17 of the housing 3, preventing the door from shutting completely, or the latch finger 80 will be resting on top of the latch keeper 72 or 73, preventing the latch member 70 or 71 from returning to the lowered position. If the latch member 71 is not in the lowered position, the horizontal leg 95 of the latch engagement member will hit the grip end 78 of the latch member 71 when the user tries to shut the door 18 or 19 noticeably preventing the door from shutting and informing the user that the tray 2 is not fully retracted to the centered position.

As best seen in FIG. 4, sealing assembly is incorporated into each door 18 and 19 and the ends 16 and 17 of the housing 3 to prevent water from entering the housing 3. More specifically, left and right door receiving frames 101 and 102 extend around an inner surface of the storage box housing 3 adjacent the left and right ends 16 and 17 thereof and define the left and right housing openings 14 and 15. The frames 101 and 102 are formed from strips of angle iron 105 welded to the inner surface of the housing 3 so as to extend along the front panel 6, cover 8, rear panel 7 and across the open bottom 9. A vertical leg 106 of each angle iron 105 extends inward from the housing 3 towards the interior and a horizontal leg 107 extends perpendicular to the vertical leg 106 and outward relative to the associated opening 14 or 15. The vertical leg is spaced inward from the associated end 16 or 17 of the housing 3 so that the outer end of the horizontal leg 107 does not extend beyond the end 16 or 17 of the housing 3. A channel is thereby formed between the angle iron 105 and the housing 3 around the periphery of the associated openings 14 and 15.

Each door 18 and 19 is formed from a sheet of metal shaped in a geometry corresponding to but slightly smaller than the ends 16 and 17 of the housing 3 to fit in the ends 16 and 17 and completely cover the openings 14 and 15 defined by the door receiving frames 101 and 102. An inwardly turned lip 111 is formed around the periphery of each door 18 and 19. A hinge pin 115 is welded to each door 18 and 19 along a rear edge 117 thereof so that stub ends 118 (only the upper one of which is seen) of the hinge pin 115 extend above and below the top and bottom edges of the doors 18 and 19 respectively.

Hinge pin receivers or pivot bearings 121 (only the upper one of which is shown) are welded or bolted to the housing 3 proximate the top, rear corner and the bottom, rear corner respectively. The stub ends 118 of each pivot pin 115 are received in holes in the pivot bearings 121 to form a pivotal or hinged connection between the doors 18 and 19 and the housing 3. Although the doors 18 and 19 are shown connected by hinges to the rear panel 7 of the housing 3, it is foreseen that the doors 18 and 19 could be pivotally connected relative to any of the housing panels, including the front panel 6, cover panel 8 or across the open bottom 9.

A foam sealing strip 125, shown in FIG. 4, is adhered to an inner surface of each door 18 and 19 around the periphery thereof and just inside the peripheral lip 111. As best seen in FIGS. 5 and 6, when the doors 18 and 19 are pivoted to a closed position, the sealing strip 125 is preferably positioned to be compressed against the horizontal leg 107 of the door receiving frames 101 and 102 respectively. The outer surface of each door 18 and 19 also preferably extends either flush with the housing ends 16 or 17 or slightly recessed relative thereto. The engagement of the sealing strip 125 against the door receiving frames 101 and 102 functions to prevent any water that infiltrates between the housing 3 and the edge of the doors 18 and 19 from entering the interior of the housing 3. Instead the water should flow in the channel formed by the frames 101 and 102 and the cover 3 and out the gap between the bottom of the doors 18 and 19 and the open bottom 9 of the housing 3. Water is thereby prevented from entering the housing 3 and collecting in the bottom of the tray 2 or the bottom of the housing 3.

A quarter turn latch 129 is mounted to each door 18 and 19 and includes a pivotal latch member 131 which extends inward of the respective door receiving frame 101 and 102 when the doors 18 and 19 are closed. The latch members 131 may be rotated behind the associated frames 101 and 102 to hold the doors 18 and 19 in the closed position. Each latch 129 includes a lock 132, such as a keyed lock, for locking the doors 18 and 19 shut.

Cushions 136 and 137 are preferably mounted on inner surfaces of doors 18 and 19 respectively to engage the end walls of the tray 2 when the doors are shut to help hold the tray 2 in place and reduce any rattling noises and the like which might result from un-dampened movement of the tray 2 as the truck 4 moves. More specifically, even though the latch members 70 and 71 generally engage the latch keepers 72 and 73 to hold the tray 2 in the retracted position, the distance between the outer edges of the latch keeper teeth when the latch members 70 and 71 are in the lowered position, will be slightly greater than the distance between the inner edges of the latch keepers 72 and 73 to allow the latch members 70 and 71 to pivot into and out of engagement with the latch keepers 72 and 73. Therefore, unless the tray 2 is further restrained, it will be allowed to move back and forth slightly which may result in a rattle under certain driving conditions. The cushions 136 and 137 may be formed from closed cell foam that is adhered to the inner surface of the doors 18 and 19. The cushions 136 and 137 are formed of a length that is long enough and are positioned to engage the tray end walls 27 and 28 respectively when the doors 18 and 19 are closed with some compression of the cushions 136 and 137. The cushions 136 and 137 thereby biasingly hold the tray 2 in a retracted position to minimize any rattling or other noise created by movement of the tray 2.

It is foreseen that the cushions, dampeners or restraining members 136 and 137 could be of a wide variety of forms designed to hold the tray 2 in place. For example, the cushions could be spring loaded or cam actuated or formed from material other than closed cell foam and including spring steel. It is also foreseen that the restraining members 136 and 137 could be mounted on the end walls 27 and 28 of the tray 2 to engage the respective doors 18 and 19 when closed. The restraining members may also be connected to the doors 18 and 19 or tray 2 by means other than adhesive, including by bolting or wielding structure thereto. It is also foreseen that the restraining members 136 and 137 could be used to hold the tray 2 in the retracted position when the doors 18 and 19 are closed, without use of separate latch members, such as latch members 70 and 71.

To install the storage box 1, the roller support beams 46 and 47 with the rollers 42 bolted thereto are bolted to the front and rear panels 6 and 7 of the housing 3. Only one of the latch keepers 72 or 73 is bolted in place to the associated roller support beam 46 or 47. For example, the right or second latch keeper 73 may be bolted to the rear roller support beam 47 so that the latch keeper 73 is positioned proximate the right opening 15 of the housing 3. The tray 2 may then be inserted into the housing 3 through the left opening 14. The tray 2 is slid into the housing 3 until the outer edge 87 of the latch finger 80 on the latch member 71 connected to the rear sidewall 26 of the tray 2 abuts against the latch keeper 73 on the rear roller support beam 47. The first or left latch keeper 72 may then be bolted in place to the front roller support beam 46 so that the latch keeper 72 extends in front of the latch finger 80 on the first latch member 70.

The housing 3 is then bolted to the surface of the secondary structure to which it is to be attached, such as a flat bed, by driving screws through the mounting flanges 52 on the roller support beams 46 and 47 which are connected to and may be considered part of the housing 3. Access to the mounting flanges 52 is gained by sliding the tray 2 out the opposite end of the housing from the end to be bolted down. If the tray 2 needs to be completely removed from the housing 3, one of the latch keepers 72 or 73 can be unbolted and removed to allow the tray 2 to be slid out the associated end of the housing 3.

The storage box 1 may be used in applications other than mounting on the bed of a flat bed truck. The storage box 1 may be adapted for mounting across the sidewalls of a standard pick-up truck, across the frame of a trailer or across the frame of a truck-type tractor. It is foreseen that in these applications, the housing 3 would likely include a bottom panel instead of an open bottom as with the embodiment disclosed above. It is also foreseen that a storage box 1 of the type disclosed, could be mounted beneath the bed of a flat-bed trailer generally running lengthwise relative to the trailer. In such an application, the top of the housing would likely be formed as an open top and a housing panel would be formed across the bottom thereof and below the storage tray 2. The bottom housing panel may still be referred to as a cover or cover panel.

Referring to FIG. 7, there is shown an alternative embodiment, wherein the storage box 141, similar in construction to storage box 1, is built into the base 143 of a headache rack 144 of a flat bed truck 145. In the embodiment as shown in FIG. 1, the storage box 1 is positioned adjacent the frame members forming the headache rack, but it is not integrated into the base thereof.

FIGS. 8-10, show alternative or additional tray restraining assemblies or latches 151 and 152 mounted on the left and right end walls 27 and 28 of the tray 2 respectively. Each assembly 151 and 152 includes a U-shaped bracket 155 fixedly connected to the respective end wall 27 or 28 and a latch member 157 pivotally connected to the U-shaped base bracket 155. Each U-shaped base bracket or U-bracket 155 includes a web 159 positioned against an outer surface of the respective tray end wall 27 or 28 and a pair of spaced apart legs 161 and 162 projecting outward therefrom. The legs 161 and 162 are vertically oriented.

Each latch member 157 is roughly z-shaped, having a foot 165, a latch bar 166 and a connecting web 167 extending between the foot 165 and latch bar 166. The latch member may be formed from sheet metal formed in the shape shown. The foot 165 and latch bar 166 generally extend in parallel planar alignment with the connecting web 167 extending generally perpendicular to both the foot 165 and the latch bar 166. A tab or stop 169 is formed as part of the latch member 157 and extends generally perpendicular to both the latch bar 166 and the connecting web 167. The stop 169 extends generally horizontally inward from the latch bar 166 along an upper edge of the latch bar 166 when it is pivoted to a horizontal alignment or latch position.

The foot 165 of each latch member 157 is pivotally connected to the web 159 of the associated U-bracket 161 or 162 by a pivot pin, rivet or the like 171. At-bolt 173 having a threaded stem 174 and a transverse, grippable head 175 is threaded through the latch bar 166 with the threaded stem 174 extending into engagement with or in close proximity to the associated left or right end wall 27 or 28. A resilient cap 177 is secured on the distal end 178 of the latch bar 166 opposite the foot 165.

The latch member 157 is pivotable between a latched or engaged position as shown in FIG. 9 and an unlatched or disengaged position as shown in FIG. 8. In the unlatched position, the latch member 157 and latch bar 166 extends just past vertical. In the latched position, the latch member 157 extends horizontally with the distal end 178 of the latch bar 166 extending just inside of the angle iron 105 forming the portion of the associated door receiving frame 101 or 102 extending vertically and adjacent rear panel 7 of the housing 3. As best seen in FIGS. 9 and 10 when the latch members 157 are advanced to the latched position, the tab or stop 169 abuts against and engages the outer leg 162 of the U-bracket 155 preventing the latch bar 166 and latch member 157 from pivoting past horizontal. Referring to FIG. 8, when the latch member 157 is pivoted to the unlatched position, the edge of latch member 157, generally along the foot 165, abuts against the inner leg 161 of the U-bracket 155 to hold the latch member 157 in position just past vertical so that the latch member 157 does not fall back into the latched position.

The t-bolts 173 are used to draw the resilient cap 177 on the distal end 178 of each latch member 157 outward against the associated door receiving frame 101 and 102. Manually rotating the t-bolt 173 clockwise against the tray end wall 27 or 28 draws the distal end 178 of the latch member 157 outward either due to slack provided between the end of the pivot pin 171 and the end wall 27 or 28 or due to flexing of the latch member 157 generally along its connecting web 167. With the tray 2 in the retracted or centered position, the t-bolts 173 on the latch member 157 of each tray restraining assembly 151 and 152 may be tightened or rotated clockwise to draw the distal ends 178 and resilient caps 177 of the latch members 157 outward against the respective door receiving frames 101 and 102 to restrain the tray 2 from sliding back and forth due to the slack in the primary latch assemblies 167 and 168 as described previously.

In use, only the tray restraining assembly 151 or 152 on the side of the storage box 1 from which the tray 2 is to be withdrawn needs to be advanced out of the latched position and into the unlatched position so as not to interfere with withdrawing of the tray 2 upon disengagement of the corresponding latch assembly 67 or 68. For example, if the tray 2 is to be removed from the left end 16 through left opening 14, the operator would first open the left door 18. The operator then pivots the latch member 157 of the left tray restraining assembly 151 from the engaging position to the disengaged position. The operator does so by first grasping the head 174 of the t-bolt 173 and rotating it counter-clockwise to back the distal end 178 and resilient cap 177 away from the door receiving frame 101. The operator then pivots the latch member 157 to the vertical orientation, out from behind the door receiving frame 101. With the latch member 157 disengaged, the operator can then disengage the primary latch assembly 67 by grasping and raising the moveable latch member 79. The user can then pull the tray 2 out the left end 16 of the storage box 1.

When the tray 2 is subsequently returned to the centered position, and automatically latched in position by the left primary latch assembly 67, the operator then pivots the latch member 157 of left tray restraining assembly 151 back to the horizontal, latched position. The operator then tightens the t-bolt 173 as necessary, by rotating it clockwise to draw the distal end 178 of the latch member 157 and the resilient cap 177 back against the left door receiving frame 101 to hold the tray in position.

Referring to FIGS. 11 through 14, there is shown an alternative embodiment of a storage tray 201 incorporating an alternative latch assembly 202. The alternative latch assembly 202 permits the tray 201 to be latched in position relative to an associated storage box at multiple incremental positions or degrees of withdrawal from the storage box. In the embodiment shown, the tray 201 may be latched in position in the retracted position (as shown in FIG. 12), with the tray withdrawn approximately fifteen percent, thirty percent, forty five percent or sixty percent or more out either the left or right opening of the storage box.

Except as otherwise described below, the storage box is constructed in a manner similar to storage box 1 and includes a housing 204 with front and rear sidewalls 206 and 207 and a cover panel not shown. Front and rear roller support beams 208 and 209 are connected or mounted to the front and rear sidewalls 206 and 207 respectively and support rollers 210 on which the tray 201 is supported.

The latch assembly 202 includes a pair of notched rails 211 and 212, each with a plurality of notches 213 formed therein, mounted to and extending substantially the entire length of the inside of the front and rear sidewalls 206 and 207 of the housing 204 respectively and a latch mechanism 214 connected to front and rear sidewalls 215 and 216. Although the notched rails 211 and 212 are shown as being formed separate from the font and rear roller support beams 208 and 209, it is to be understood that each matched pair could be formed as a single piece. In addition, it is foreseen that the geometry of the notched rails 211 and 212 can be modified if necessary to fit the dimensions of the specific application, but generally will include a vertically extending leg with notches 213 formed therein.

In the embodiment shown, six notches 213 are formed in the upper edge of each rail 211 and 212. The notches 213 are preferably spaced apart an equal distance with pairs of notches aligned on opposed rails 211 and 212. The latch mechanism 214 includes front and rear latch pins 219 and 220 mounted on front and rear latch pin pivot plates 221 and 222 which are pivotally mounted on the front and rear tray sidewalls 215 and 216 respectively with the latch pins 219 and 220 projecting outward therefrom. The latch pins 219 and 220 are pivotally advanceable into selected notches 214 on the rails 211 and 212 to fix the position of the tray 201 relative to the rails 211 and 212 and the storage box, and out of the notches 213 to allow the tray 201 to slide relative to the storage box.

Pivoting of the latch pins 219 and 220 is controlled by front and rear linkages 225 and 226 which are connected together by left and right latch handles 229 and 230 and which form part of the latch mechanism 214. Each linkage 225 and 226 includes a pair of links 233 and 234 connected to and extending on opposite sides of the associated latch pin pivot plate 221 and 222. In the embodiment shown one of the links, link 233 is shorter than the other link, link 234 with the shorter link 233 of the front linkage 225 extending to the right of the front latch pin pivot plate 221 and the shorter link 233 of the rear linkage 226 extending to the left of the rear latch pin pivot plate 222.

The links 233 and 234 are of different lengths to accommodate the offset spacing of the latch pin pivot plates 221 and 222 on the front and rear sidewalls 225 and 226 of the storage tray 201. The pivot plates 221 and 222 are offset from one another to allow latching or fixing the tray 201 in position when extended more than roughly fifty percent out of the storage box. More specifically, front pivot plate 221 and associated latch pin 219 are spaced away from the left end wall 235 of tray 201 roughly two thirds of the length of the storage tray 201, and rear pivot plate 222 and associated latch pin 220 are spaced away from the right end wall 236 of tray 201 roughly two thirds of the length of the storage tray 201. Therefore, the front latch pin 219 can be positioned in the last notch 213 on the front notched rail 211 to fix the tray 201 in position when it is pulled roughly sixty percent of its length out the left end of the storage box. Similarly, the rear latch pin 220 can be positioned in the last notch 213 of the rear notched rail 212 to fix the tray 20 1in position when it is pulled roughly sixty percent of its length out the right end of the storage box.

Each handle 229 and 230 includes a cross-bar 237 and front and rear legs 238 and 239 which are pivotally connected to the tray sidewalls 215 and 216. Front leg 238 of left latch handle 229 is pivotally mounted to the tray front sidewall 215 proximate the left end thereof and rear leg 239 of left latch handle 229 is pivotally mounted to the tray rear sidewall 216 proximate the left end thereof. Front leg 238 of right latch handle 230 is pivotally mounted to the tray front sidewall 215 proximate the right end thereof and rear leg 239 of right latch handle 230 is pivotally mounted to the tray rear sidewall 216 proximate the right end thereof.

Referring to FIGS. 12 and 13, the front linkage 225 is connected between the front legs 238 of the left and right handles 229 and 230 and the rear linkage 226 is connected between the rear legs 239 of the left and right handles 229 and 230. Long link 234 of front linkage 225 is pivotally connected at its outer end to the front leg 238 of left latch handle 230 in spaced relation above the pivotal connection between the handle front leg 238 and tray front sidewall 215. Front linkage long link 234 is pivotally connected at its inner end to the front latch pin pivot plate 221 in spaced relation above the pivotal connection between front latch pin pivot plate 221 and tray front sidewall 215. Front linkage short link 233 is connected at its outer end to the front leg 238 of right latch handle 230 in spaced relation above the pivotal connection between the handle front leg 238 and tray front sidewall 215. Front linkage short link 233 is pivotally connected at its inner end to the front latch pin pivot plate 221 in spaced relation below the pivotal connection between the front latch pin pivot plate 221 and tray front sidewall 215. In the embodiment shown, the front latch pin 219 is spaced to the right of and above an axis extending through the pivot point for the pivot plate 221.

Long link 234 of rear linkage 226 is pivotally connected at its outer end to the rear leg 239 of right latch handle 231 in spaced relation above the pivotal connection between the handle rear leg 239 and tray rear sidewall 216. Rear linkage long link 234 is pivotally connected at its inner end to the rear latch pin pivot plate 222 in spaced relation above the pivotal connection between rear latch pin pivot plate 222 and tray rear sidewall 216. Rear linkage short link 233 is connected at its outer end to the rear leg 239 of left latch handle 229 in spaced relation above the pivotal connection between the handle rear leg 239 and tray rear sidewall 216. Rear linkage short link 233 is pivotally connected at its inner end to the rear latch pin pivot plate 222 in spaced relation below the pivotal connection between the rear latch pin pivot plate 222 and tray rear sidewall 216. In the embodiment shown, the rear latch pin 220 is spaced to the left of and above an axis extending through the pivot point for the pivot plate 222.

A front spring 241 connected between the front linkage long link 234 and the tray front sidewall 215 normally draws the front linkage long link 234 to the right causing the front latch pin pivot plate 221 to pivot clockwise (when viewed facing the tray front sidewall 215 as in FIG. 12), urging front latch pin 219 to pivot downward and into a notch 213 aligned with or positioned below the latch pin 219. A rear spring 242 connected between the rear linkage long link 234 and the tray rear sidewall 216 normally draws the rear linkage long link 234 to the left, causing the rear latch pin pivot plate 222 to pivot clockwise (when viewed facing the tray rear sidewall 26), urging rear latch pin 220 to pivot downward and into a notch 213 aligned with or positioned below the latch pin 220.

As shown schematically in FIG. 13, pivoting the left latch handle 229 downward draws the front linkage long link 234 and the rear linkage short link 233 to the left causing the front latch pin pivot plate 221 and associated latch pin 219 to pivot counterclockwise and out from or above an aligned notch 213 in front rail 211 and causing the rear latch pin pivot plate 222 and associated latch pin 220 to pivot counter-clockwise and out from an aligned notch 213 in rear rail 212. With the latch pins 219 positioned above the notches 213 in front and rear rails 211 and 212, an operator may slide the tray 201 relative to the storage box.

As the user pulls the storage tray 201 out of the left side of the storage box, if the user continues to push downward on the left latch handle 229, the tray 201 can be pulled from the storage box out the left end the full extent permitted, before a first stop 245 mounted on the tray front sidewall 215 engages a left side travel stop 246 mounted to front roller support beam 208 or the front notched rail 211. When the tray 201 is fully extended out the left side of the housing with the first stop 245 on the tray engaging travel stop 246, the latch pin 219 is positioned above the leftmost notch 213 on the front notched rail 211. When the left latch handle 229 is released, the springs 241 and 242 act on long links 234 to cause the latch pins 219 and 220 to pivot downwards, with latch pin 219 pivoting into the notch 213 closest the left side travel stop 246 to hold the tray 201 in the fully extended position. Similarly, holding down on the left latch handle 229 allows the tray 201 to be slid into the housing until it is centered therein without engaging intermediate notches 213 on the front and rear notched rails 211 and 212. If the left latch handle 229 is pulled upwards as the tray 201 is pushed or pulled into or out of the storage box, the latch pins 219 and 220 will advance into the next set of notches 213 aligned therewith to secure tray 201 in place relative to the housing of the storage box.

The right latch handle 230 operates in a manner similar to the left latch handle 229. Pivoting the right latch handle 230 downward draws the rear linkage long link 234 and the front linkage short link 233 to the right causing the front latch pin pivot plate 221 and associated latch pin 219 to pivot counterclockwise and out from or above an aligned notch 213 in front rail 211 and causing the rear latch pin pivot plate 222 and associated latch pin 220 to pivot counterclockwise and out from an aligned notch 213 in rear rail 212. With the latch pins 219 positioned above the notches 213 in front and rear rails 211 and 212, an operator may slide the tray 201 relative to the storage box. Releasing or pulling upward on the right latch handle 230 allows the latch pins 219 and 220 to advance into notches 213 brought into alignment with the pins 219 and 220 as the tray moves relative to the rails 211 and 212. A second stop 247 mounted on the tray front sidewall 215 engages a right side travel stop 248 mounted to the storage box housing 204 or the front notched rail 211 when the tray 201 to limit extension of the tray 201 a desired amount, which in the embodiment disclosed is approximately sixty percent.

Alternative latch engagement members 251 and 252 are mounted on inner surfaces of the left and right doors 253 and 254 of the storage box. Latch engagement members 251 and 252 are similar in construction as latch engagement members 92 and 93. Latch engagement members 251 and 252 are L-shaped with a vertical leg 255 mounted to the associated door 253 or 254 and a horizontal leg 256 extending inward therefrom. The latch engagement members 251 and 252 are positioned so that the horizontal leg 256 extends just above the latch bars 166 of the left and right tray restraining assemblies 151 and 152 when the storage tray 201 is in a centered position relative to storage box, the latch bars 166 are pivoted to engage the door receiving frame members and the doors 253 and 254 are shut. The latch engagement members 251 and 252 thereby prevent the left and right latch bars 166 from inadvertently pivoting out of engaging relationship with the door receiving frame members and thereby prevent the tray 201 from moving out of the centered alignment when the doors 253 and 254 are closed.

In addition, if the tray 201 is not centered when a user tries to shut the doors 253 and 254, before the latch bars 166 are pivoted into engaging relationship with one of the door receiving frame members, the horizontal leg 256 of the latch engaging members 251 and 252 will hit the associated latch bar 166 before the door is completely shut, giving the user a physical indication that the tray 201 is not centered within the box. The tray restraining latches 151 and 152, also function to prevent the storage tray 201 from moving relative to the storage box to prevent rattling.

It is to be understood that while certain forms of the present invention have been illustrated and described herein, it is not to be limited to the specific forms, process steps or arrangement of parts described and shown and that the invention should be limited only by the claims. For example, it is foreseen that the moveable latch member could slide vertically instead of pivoting. It is also foreseen that the latch keepers could be mounted on the tray sidewalls and the latches mounted on the roller support beams 46 and 47 or the housing sidewalls 6 and 7.

It is also foreseen that the geometry of the housing 3 and the tray could be varied too. For example, the housing could have a rectangular cross-section with a flat top cover and the sidewalls of the associated tray could be of the same height to present a rectangular cross-section as well. Storage boxes having a rectangular cross-section would be more conducive to allowing one storage box to be stacked on top of another to provide multiple trays for storing more tools and equipment.

It is also foreseen that the latch engagement members could be of different configurations while still engaging the moveable latch member to hold it from coming unlatched when the associate door is closed. For example each latch engagement members could be formed as a bail projecting inward from an inner surface of the associated door 18 or 19. The engagement member could extend into a slot, recess or other receiver formed in the grip end 78 of the latch member.

What is claimed is:

1. A flatbed truck comprising:
an open truck bed with no sides; and
a storage box coupled to and positioned transverse across the truck bed, the storage box comprising:
a housing including a first end and a second end, the first end and the second end being positioned opposite each other along a lengthwise axis of the housing;
a tray that moves between a first position where the tray extends out of the first end of the housing and a second position where the tray extends out the second end of the housing;
a first latch assembly positioned at the first end of the housing, the first latch assembly moving between a latched position where the tray is retracted and prevented from extending out of the first end of the housing and an unlatched position where the tray is allowed to extend out of the first end of the housing;
a second latch assembly positioned at the second end of the housing, the second latch assembly moving between a latched position where the tray is retracted and prevented from extending out of the second end of the housing and an unlatched position where the tray is allowed to extend out of the second end of the housing; and
a first stop member that limits the length the tray can extend out the first end of the housing and a second stop member that limits the length the tray can extend out the second end of the housing;
wherein the tray includes opposing sides that are spaced apart and extend parallel to the lengthwise axis of the housing, and wherein the first stop member is positioned on one of the opposing sides and the second stop member is positioned on the other one of the opposing sides.

2. The flatbed truck of claim 1 wherein the storage box comprises a first door pivotably connected to the housing and a second door pivotably connected to the housing, wherein the first door covers the first end of the housing and the second door covers the second end of the housing.

3. The flatbed truck of claim 1 wherein the storage box is fully enclosed when separated from the flatbed truck except for the bottom which is open.

4. The flatbed truck of claim 1 wherein the tray is slidably coupled to the housing.

5. The flatbed truck of claim 1 wherein the tray is supported by a plurality of roller bearings projecting inward from the housing.

6. A flatbed truck comprising:
an open truck bed with no sides;
a storage box coupled to and positioned transverse across the truck bed, the storage box including:
a housing including a first end and a second end, the first end and the second end being positioned opposite each other along a lengthwise axis of the housing;
a tray that moves between a first position where the tray extends out of the first end of the housing and a second position where the tray extends out the second end of the housing; and
a first stop member that limits the length the tray can extend out the first end of the housing and a second stop member that limits the length the tray can extend out the second end of the housing;
wherein the tray includes opposing sides that are spaced apart and extend parallel to the lengthwise axis of the housing; and wherein the first stop member is positioned on one of the opposing sides and the second stop member is positioned on the other one of the opposing sides.

7. The flatbed truck of claim 6 wherein the storage box includes a first door pivotably connected to the housing and a second door pivotably connected to the housing, wherein the first door covers the first end of the housing and the second door covers the second end of the housing.

8. The flatbed truck of claim 6 wherein the truck bed forms the bottom of the storage box and wherein the storage box is fully enclosed when separated from the flatbed truck except for the bottom which is open.

9. The flatbed truck of claim 6 wherein the tray is slidably coupled to the housing.

10. The flatbed truck of claim 6 wherein the tray is supported by a plurality of roller bearings projecting inward from the housing.

11. The flatbed truck of claim 6 wherein the storage box includes a first latch assembly positioned at the first end of the housing that prevents the tray from extending out of the first end of the housing when the tray is retracted in the housing and a second latch assembly positioned at the second end of the housing that prevents the tray from extending out of the second end of the housing when the tray is retracted in the housing.

12. A flatbed truck comprising:
an open truck bed with no sides; and
a storage box coupled to and positioned transverse across the truck bed, the storage box comprising:
a housing including a first end and a second end, the first end and the second end being positioned opposite each other along a lengthwise axis of the housing;
a first door pivotably connected to the housing, the first door covering the first end of the housing;
a second door pivotably connected to the housing, the second door covering the second end of the housing;
a tray that moves between a first position where the tray extends out of the first end of the housing and a second position where the tray extends out the second end of the housing;
a first latch assembly positioned at the first end of the housing, the first latch assembly moving between a latched position where the tray is retracted and prevented from extending out of the first end of the housing and an unlatched position where the tray is allowed to extend out of the first end of the housing; and
a second latch assembly positioned at the second end of the housing, the second latch assembly moving between a latched position where the tray is retracted and prevented from extending out of the second end of the housing and an unlatched position where the tray is allowed to extend out of the first end of the housing;
wherein the tray includes opposing sides that are spaced apart and extend parallel to the lengthwise axis of the housing; and
wherein the first latch assembly is positioned on one of the opposing sides and the second latch assembly is positioned on the other one of the opposing sides.

13. The flatbed truck of claim 12 wherein the storage box is fully enclosed when separated from the flatbed truck except for the bottom which is open.

14. The flatbed truck of claim 12 wherein the tray is supported by a plurality of roller bearings projecting inward from the housing.

15. The flatbed truck of claim 12 comprising a first stop member that limits the length the tray can extend out the first end of the housing and a second stop member that limits the length the tray can extend out the second end of the housing, wherein the first stop member is positioned on one of the opposing sides of the tray and the second stop member is positioned on the other one of the opposing sides of the tray.

16. A flatbed truck comprising:
an open truck bed with no sides; and
a storage box coupled to and positioned transverse across the truck bed, the storage box comprising:
a housing including a first end and a second end, the first end and the second end being positioned opposite each other along a lengthwise axis of the housing;
a tray that moves between a first position where the tray extends out the first end of the housing and a second position where the tray extends out the second end of the housing, the tray including opposing sides that are spaced apart and extend parallel to the lengthwise axis of the housing;
a first latch assembly positioned at the first end of the housing, the first latch assembly moving between a latched position where the tray is retracted and prevented from extending out of the first end of the housing and an unlatched position where the tray is allowed to extend out of the first end of the housing;
a second latch assembly positioned at the second end of the housing, the second latch assembly moving between a latched position where the tray is retracted and prevented from extending out of the second end of the housing and an unlatched position where the tray is allowed to extend out of the second end of the housing; and
a first stop member that limits the length the tray can extend out the first end of the housing and a second stop member that limits the length the tray can extend out the second end of the housing;
wherein the first latch assembly is positioned on one of the opposing sides of the tray and the second latch assembly is positioned on the other one of the opposing sides of tray; and
wherein the first stop member is positioned on one of the opposing sides of the tray and the second stop member is positioned on the other one of the opposing sides of the tray.

17. The flatbed truck of claim 16 wherein the storage box is fully enclosed when separated from the flatbed truck except for the bottom which is open.

18. The flatbed truck of claim 16 wherein the tray is supported by a plurality of roller bearings projecting inward from the housing.

19. The flatbed truck of claim 1 wherein the first stop member and the second stop member are completely separate and independent components from the first latch assembly and the second latch assembly.

20. The flatbed truck of claim 1 wherein the tray extends out the first end of the housing a distance that is no more than 80% of the length of the tray and the tray extends out the second end of the housing a distance that is no more than 80% of the length of the tray.

* * * * *